US012654608B2

(12) United States Patent　　　　(10) Patent No.:　US 12,654,608 B2
Kang et al.　　　　　　　　　　　　　(45) Date of Patent:　　Jun. 16, 2026

(54) TRAY TABLE FOR REAR VEHICLE PASSENGERS WITH FIRST PIECE AND SECOND PIECE CONFIGURED TO AUTOMATICALLY MOVE BETWEEN OPEN AND CLOSED POSITIONS

(71) Applicant: GM GLOBAL TECHNOLOGY OPERATIONS LLC, Detroit, MI (US)

(72) Inventors: Bohyuk Kang, Bucheon-si (KR); Taeheon Kim, Goyang-si (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 18/614,500

(22) Filed: Mar. 22, 2024

(65) Prior Publication Data

US 2025/0296490 A1　　Sep. 25, 2025

(51) Int. Cl.
B60N 3/00　　　　　(2006.01)

(52) U.S. Cl.
CPC ..................................... B60N 3/004 (2013.01)

(58) Field of Classification Search
CPC .......... B60N 3/004; B60N 2/427; B60N 2/42; B64D 11/0638
See application file for complete search history.

(56) References Cited

U.S. PATENT DOCUMENTS 5,108,059 A　　4/1992　Curtis
5,857,740 A *　1/1999　Duboulet ............... B60N 3/004
　　　　　　　　　　　　　　　　　　　　297/173

| | | | |
|---|---|---|---|
| 7,651,160 B2 * | 1/2010 | Okumura ............... B60N 3/004 |
| | | | 108/42 |
| 9,422,059 B2 * | 8/2016 | Martinak ........... B64D 11/0638 |
| 10,562,635 B2 * | 2/2020 | Colletti .................... B60R 11/02 |
| 10,589,652 B2 * | 3/2020 | Preisler .................... A47B 1/10 |
| 10,640,027 B2 * | 5/2020 | Hirano ................... B60N 3/004 |
| 12,454,208 B2 * | 10/2025 | Matsubara ............. B60N 3/103 |
| 2004/0239155 A1 * | 12/2004 | Fourrey ................. B60N 3/004 |
| | | | 297/163 |
| 2011/0155024 A1 * | 6/2011 | McCaffrey ............. B60N 3/004 |
| | | | 108/26 |
| 2016/0059759 A1 * | 3/2016 | Rook ....................... A47B 5/04 |
| | | | 297/173 |
| 2021/0401180 A1 * | 12/2021 | Pierce .................... A47C 7/386 |

FOREIGN PATENT DOCUMENTS

| | | | | |
|---|---|---|---|---|
| CN | 113650539 A | * | 11/2021 | ............. B60N 2/666 |
| DE | 19516011 C1 | | 8/1996 | |
| DE | 19731231 A1 | | 1/1998 | |
| DE | 202006007913 U1 | | 9/2003 | |
| DE | 102012012850 A1 | | 1/2014 | |
| DE | 102022110914 A1 | | 11/2023 | |
| EP | 2671467 A2 | | 12/2013 | |

* cited by examiner

*Primary Examiner* — Arfan Y. Sinaki

(74) *Attorney, Agent, or Firm* — Ingrassia Fisher & Lorenz, LLP | IF&L

(57)　　　　　　　ABSTRACT

A tray table is provided for a vehicle, the tray table including a first piece configured to be attached to a seat back of a seat of the vehicle; a spring hinge; and a second piece movably coupled to the first piece via the spring hinge, the second piece movable between an open position, in which the second piece extends away from the first piece and the seat back; and a closed position, in which the second piece rests against the first piece and the seat back, during a vehicle event.

15 Claims, 4 Drawing Sheets

TRAY TABLE FOR REAR VEHICLE PASSENGERS WITH FIRST PIECE AND SECOND PIECE CONFIGURED TO AUTOMATICALLY MOVE BETWEEN OPEN AND CLOSED POSITIONS

INTRODUCTION

The technical field generally relates to vehicles and, more specifically, to tray tables for vehicles.

Certain vehicles today include tray tables for one or more passengers of the vehicle. However, existing tray tables may not always be optimal, for example with respect to potentially contacting the users when vehicle conditions change.

Accordingly, it is desirable to provide tray tables and related systems for vehicles. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a tray table is provided for a vehicle, the tray table including a first piece configured to be attached to a seat back of a seat of the vehicle; a spring hinge; and a second piece movably coupled to the first piece via the spring hinge, the second piece movable between an open position, in which the second piece extends away from the first piece and the seat back; and a closed position, in which the second piece rests against the first piece and the seat back, during a vehicle event.

Also in an exemplary embodiment, the second piece is configured to automatically move between the open position and the closed position in a manner that prevents or mitigates contact with an occupant of the vehicle during the vehicle event in which sudden movement of the vehicle is occurring.

Also in an exemplary embodiment, the second piece is configured to move between the open position and the closed position in a manner that prevents or mitigates contact with an occupant of the vehicle during the vehicle event in which a deceleration of the vehicle exceeds a predetermined threshold.

Also in an exemplary embodiment, the tray table further includes one or more respective magnets on both the first piece and the second piece that connect together to hold the first piece and the second piece together while the second piece is in the closed position, and that separate when a force is applied while the second piece is in the open position.

Also in an exemplary embodiment, the tray table further includes one or more restraints that are configured to provide rigidity for the tray table between the first piece and the second piece when the second piece is in the open position, and that is configured to be able to be retracted during the vehicle event so as to reduce the rigidity and facilitate movement of the second piece to the closed position.

Also in an exemplary embodiment, the tray table further includes a solenoid that is coupled to the one or more restraints and that is configured to at least facilitate the retracting of the one or more restraints during the vehicle event.

Also in an exemplary embodiment, the solenoid is configured to be coupled to an accelerometer, to receive a signal from the accelerometer as to the vehicle event, and to at least facilitate retracting the one or more restraints based on the signal during the vehicle event.

Also in an exemplary embodiment, the one or more restraints are configured to be retracted in tandem with retraction of one or more seat belts of the vehicle during the vehicle event.

Also in an exemplary embodiment, the second piece is made at least in part of silicone.

Also in an exemplary embodiment, the second piece further includes a reinforcement line.

Also in an exemplary embodiment, the reinforcement line is in the shape of an "X".

Also in an exemplary embodiment, the tray table further includes a strap configured to hold together the first and second pieces.

In another exemplary embodiment, a tray table seat assembly for a vehicle is provided, the tray table seat assembly including a seat including a seat back; a first piece configured to be attached to the seat back; a spring hinge; and a second piece movably coupled to the first piece via the spring hinge, the second piece movable between an open position, in which the second piece extends away from the first piece and the seat back; and a closed position, in which the second piece rests against the first piece and the seat back, during a vehicle event.

Also in an exemplary embodiment, the second piece is configured to automatically move between the open position and the closed position in a manner that prevents or mitigates contact with an occupant of the vehicle during the vehicle event in which sudden movement of the vehicle is occurring.

Also in an exemplary embodiment, the tray table seat assembly further incudes one or more respective magnets on both the first piece and the second piece that connect together to hold the first piece and the second piece together while the second piece is in the closed position, and that separate when a force is applied while the second piece is in the open position.

Also in an exemplary embodiment, the tray table seat assembly further includes one or more restraints that are configured to provide rigidity between the first piece and the second piece when the second piece is in the open position, and that is configured to be able to be retracted during the vehicle event so as to reduce the rigidity and facilitate movement of the second piece to the closed position.

Also in an exemplary embodiment, the tray table seat assembly further includes a solenoid that is coupled to the one or more restraints and that is configured to at least facilitate the retracting of the one or more restraints during the vehicle event.

Also in an exemplary embodiment, the solenoid is configured to be coupled to an accelerometer, to receive a signal from the accelerometer as to the vehicle event, and to at least facilitate retracting the one or more restraints based on the signal during the vehicle event.

Also in an exemplary embodiment, the second piece is made at least in part of silicone and further includes a reinforcement line that is in the shape of an "X".

In another exemplary embodiment, a vehicle is provided that includes a body; a drive system configured to propel the body; a front seat disposed within the body and including a seat back; a rear seat disposed within the body and behind the front seat; and a tray table attached to the front seat, for use by an occupant of the rear seat, the tray table including a first piece attached to the seat back of the front seat; a spring hinge; and a second piece movably coupled to the first piece via the spring hinge, the second piece movable between an open position, in which the second piece extends away from the first piece and the seat back; and a closed position, in which the second piece rests against the first piece and the seat back, during a vehicle event.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
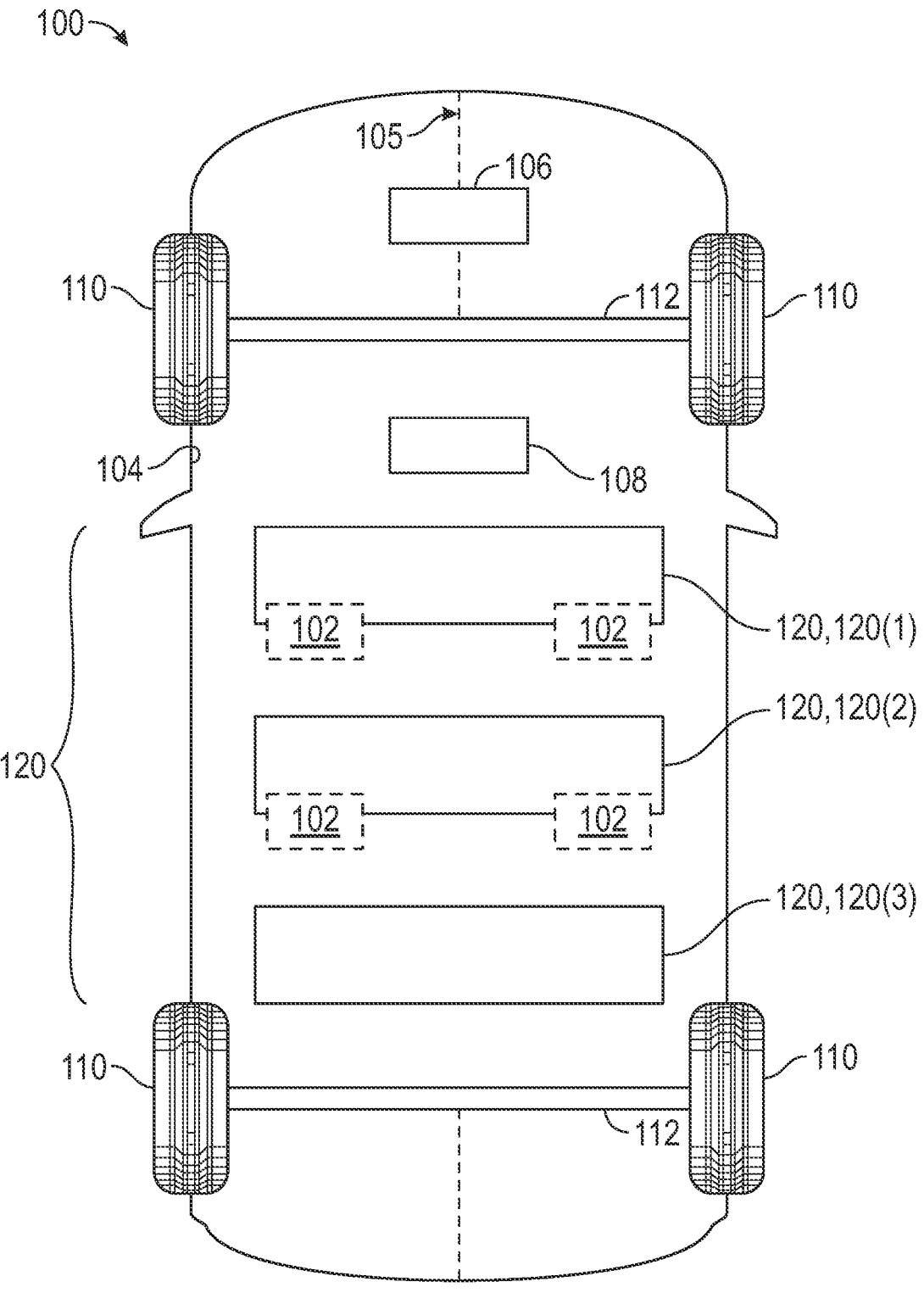
FIG. 1 provides functional block diagram of a vehicle having multiple rows of seats and tray tables for occupants for one or more rear rows of seats, in accordance with exemplary embodiment.

FIG. 1 provides a functional block diagram of a vehicle 100 that includes tray tables 102 for use by occupants of the vehicle 100. As depicted in FIG. 1 and further below in connection with FIGS. 2A-6, in various embodiments the tray tables 102 are configured to automatically fold and further to help avoid and mitigate contact with the occupants of the vehicle 100 during different vehicle conditions, for example in which emergency braking is applied and/or the vehicle 100 is otherwise experiencing rapid deceleration and/or direction changes.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 100 includes a body 104 that is arranged on a chassis 105. The body 104 substantially encloses other components of the vehicle 100. The body 104 and the chassis 105 may jointly form a frame. The vehicle 100 also includes a plurality of wheels 110. The wheels 110 are each rotationally coupled to the chassis 105 near a respective corner of the body 104 to facilitate movement of the vehicle 100. In one embodiment, the vehicle 100 includes four wheels 110, although this may vary in other embodiments (for example for trucks and certain other vehicles).

A drive system 106 is mounted on the chassis 105, and drives the wheels 110, for example via axles 112. In various embodiments, the drive system 106 comprises a propulsion system that includes a motor (e.g., an internal combustion engine and/or an electric motor/generator, coupled with a transmission thereof).

A plurality of sensors 108 are utilized for obtaining sensor data for controlling operation of the vehicle 100. In various embodiments, the sensors 108 include one or more accelerometers 108 and/or other sensors 108 that are configured to detect a rapid braking event, rapid direction changes, and/or another event that may affect the tray tables 102 and the possibility of contact between the tray tables 102 and occupants of the vehicle 100.

As depicted in FIG. 1, the vehicle 100 includes a plurality of seats 120 for occupants of the vehicle 100. Also as depicted in FIG. 1, the seats 120 may comprise a front row 120(1) of seats 120, along with one or more rear rows 120(2) and 120(3), and so on. While three rows of seats 120 are depicted in FIG. 1, it will be appreciated that this may vary in other embodiments. For example, in certain embodiments there may only be a single rear row 120(2) of seats 120, whereas in other embodiments there may be more than two rear rows 120(2), 120(3), . . . , and so on.

As depicted in FIG. 1, in various embodiments occupants in the rear row(s) (e.g., 120(2) and/or 120(3)) are able to utilize tray tables 102 that are attached to seats immediately in front of these occupants. For example, in various embodiments: (i) occupants in the second row 120(2) may utilize tray tables that are attached to a back side of the seats 120 in the first row 120(1); whereas (ii) occupants in the third row 120(3) may utilize tray tables that are attached to a back side of the seats 120 in the second row 120(2), and so on.

The tray tables 102 are depicted in FIGS. 2A-6, as depicted in various positions in accordance with exemplary embodiments, and are now described in greater detail below in connection therewith.

With reference first to FIGS. 2A, 2B, 2C, and 2D, in various embodiments the tray table 102 is attached to a seat back 202 of a seat 120 that is immediately in front of the occupant who is to use the tray table 102. Also in various embodiments as depicted in FIGS. 2A-2D, the tray table 102 comprises a first piece 204 and a second piece 206 that collectively comprise a two-piece shelf 208.

Figure 2A:
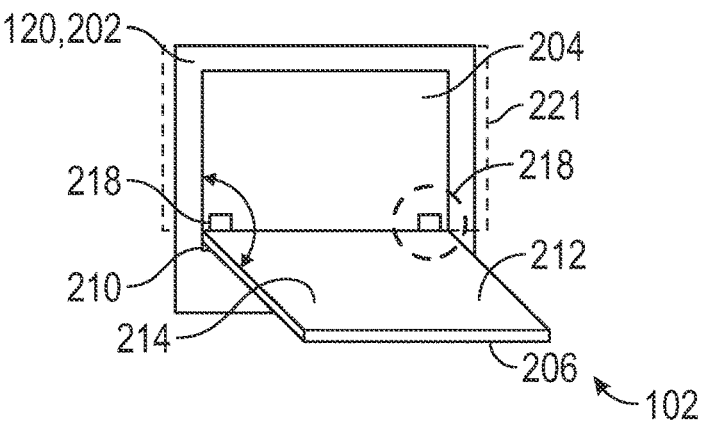
FIGS. 2A-6 depict an exemplary tray table as used in the vehicle of FIG. 1, depicted in various positions in accordance with exemplary embodiments.
Figure 2B:
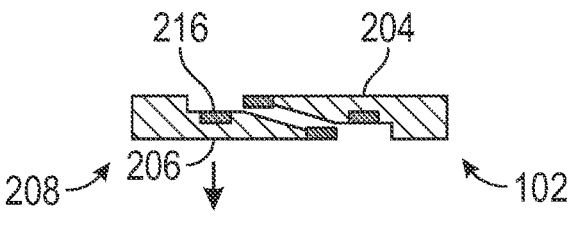
Figure 2C:
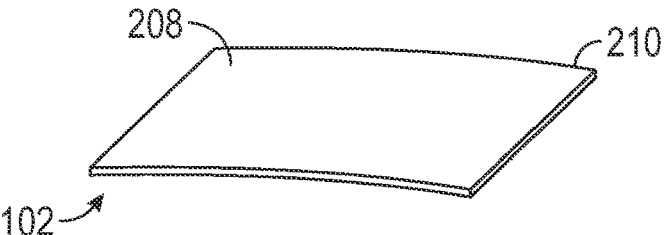

As depicted in FIGS. 2A-2D, in various embodiments the first piece 204 is attached to the seat back 202 in a fixed manner, whereas the second piece 206 is rotatable between an open position (e.g., of FIGS. 2A and 2B) and a close position (e.g., of FIG. 2C). In various embodiments, the first and second pieces 204, 206 are rotatably coupled via a springe hinge 210, for example as depicted in FIGS. 2A and 2C. In addition, in various embodiments, the second piece 206 is configured to rotate between positions based on rapid deceleration and/or other events pertaining to movement of the vehicle 100. For example in various embodiments, the second piece 206 is configured to rapidly fold shut when the vehicle 100 is experiencing an emergency braking event, rapid deceleration, rapid direction changes, and/or one or more other events in which the second piece 206 may otherwise be likely to contact the occupant.

Also as depicted in FIGS. 2A-2D, in various embodiments the second piece 206 is made of and/or coated with one or more silicon layers 212, which serves to minimize the effect of any impact energy if the second piece 206 were to contact one of the occupants of the vehicle 100. Also in various embodiments as depicted in FIGS. 2A-2D, the second piece 206 also includes a reinforcement line 214 to help provide sufficient support for the tray table 102. In various embodiments, as depicted in FIG. 2A, the second piece 206 includes a reinforcement line 214 in an "X" shape in order to reduce potential impact on occupants in the event of contact therewith.

Figure 2D:
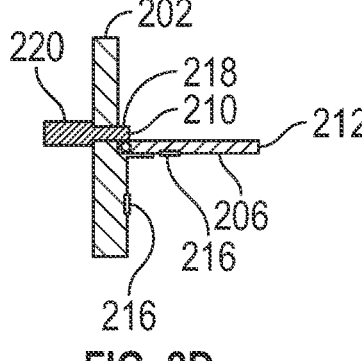

In addition, as depicted in FIGS. 2B and 2D, in various embodiments the first and second pieces 204, 206 both include respective magnets 216. In various embodiments, the magnets 216 facilitate holding the first and second pieces 204, 206 together when in the closed position. In various embodiments, the use of the magnets 216 for the two piece shelf 208 allows for the first and second pieces 204, 206 to connect to one another and to the seat back 202, but also allows for the first and second pieces 204, 206 to easily separate, via separation of the magnets 216, when a force is applied while the second piece 206 is in the open position. In various embodiments, the magnets 216 are designed to easily separate from one another when an abnormal force is applied (e.g., to the second piece 206) when the second piece 206 is in the open position. In certain embodiments, such an "abnormal" force comprises a force with a magnitude that is greater than a predetermined force threshold, such as would be consistent with rapid deceleration and/or a vehicle event. In various embodiments, the easy separation of the magnets 216 under these conditions helps to prevent or reduce unwanted contact between the tray table 102 and occupants of the vehicle 100.

Also in various embodiments, as depicted in FIGS. 2A and 2D, the tray table 102 also utilizes a solenoid 220. In various embodiments, the solenoid 220 is coupled to and/or operated by an accelerometer of the sensors 108 of FIG. 1, and releases one or more restraints 218 on the shelf 208 when a vehicle 100 event occurs, such as when rapid deceleration and/or other vehicle 100 movement may cause an occupant to come into contact with the tray table 102. In various embodiments, the one or more restraints 218 may comprise one or more pins, bars, and/or other restraints that help to hold the shelf 208 together under normal or typical conditions, but that allow the first and second pieces 204, 206 to more easily separate from one another when such a vehicle event occurs.

Also with reference to FIGS. 2A-2D, in various embodiments the tray table 102 also includes a strap 221 that helps to maintain the first and second pieces 204, 206 together. For example, in various embodiments, the strap 221 helps to prevent a loose one of the pieces 204 or 206 from coming loose and flying around inside the vehicle 100, and so on.

Figure 3A:
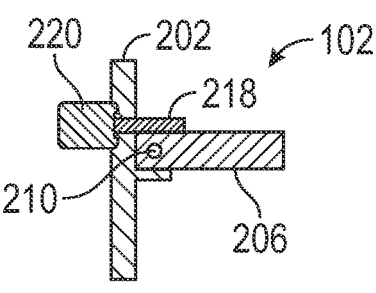
Figure 3B:
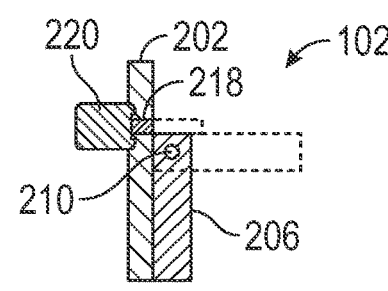

With reference to FIGS. 3A and 3B, additional images are depicted of an exemplary tray table 102 as attached to a respective seat back 202, in accordance with exemplary embodiments. As depicted in FIG. 3A, the tray table 102 is in the open position, as the restraint 218 is extended during normal or typical operation of the vehicle 100, so as to provide rigidity and support to help maintain the tray table 102 in the open position (e.g., with the second piece 206 extended away from the seat back 202). Conversely, as depicted in FIG. 3B, the tray table 102 is in the closed position, as the restraint 218 is retracted by the solenoid 220 due to a vehicle event once the solenoid 220 receives a signal (e.g., from one or more vehicle sensors that is indicative of the vehicle event), therefore reducing rigidity and facilitating the tray table 102 to move to the closed position (e.g., with the second piece 206 against the first piece 204 and the seat back 202).

Figure 4A:
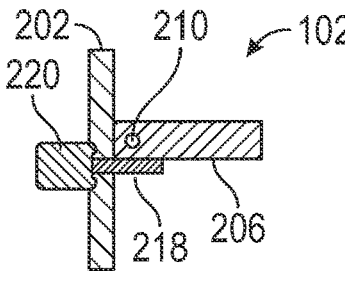
Figure 4B:
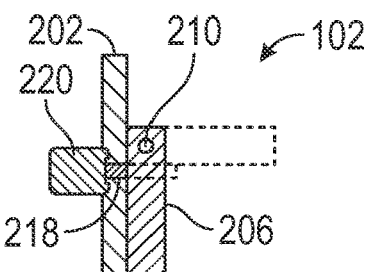

With reference to FIGS. 4A and 4B, additional images are depicted of an exemplary tray table 102 as attached to a respective seat back 202, in accordance with exemplary embodiments. The restraint 218 and the solenoid 220 have different positions as compared with FIGS. 3A and 3B (e.g., the restraint and the solenoid 220 are disposed beneath the hinge 210 in FIGS. 4A and 4B rather than above the hinge 210 in FIGS. 3A and 3B), but otherwise perform similar roles in FIGS. 4A and 4B. Specifically, as depicted in FIG. 4A, the tray table 102 is in the open position, as the restraint 218 is extended during normal or typical operation of the vehicle 100, so as to provide rigidity and support to help maintain the tray table 102 in the open position (e.g., with the second piece 206 extended away from the seat back 202). Conversely, as depicted in FIG. 4B, the tray table 102 is in the closed position, as the restraint 218 is retracted by the solenoid 220 due to a vehicle event, therefore reducing rigidity and facilitating the tray table 102 to move to the closed position (e.g., with the second piece 206 against the first piece 204 and the seat back 202).

Figures 5A, 5B, 5C:
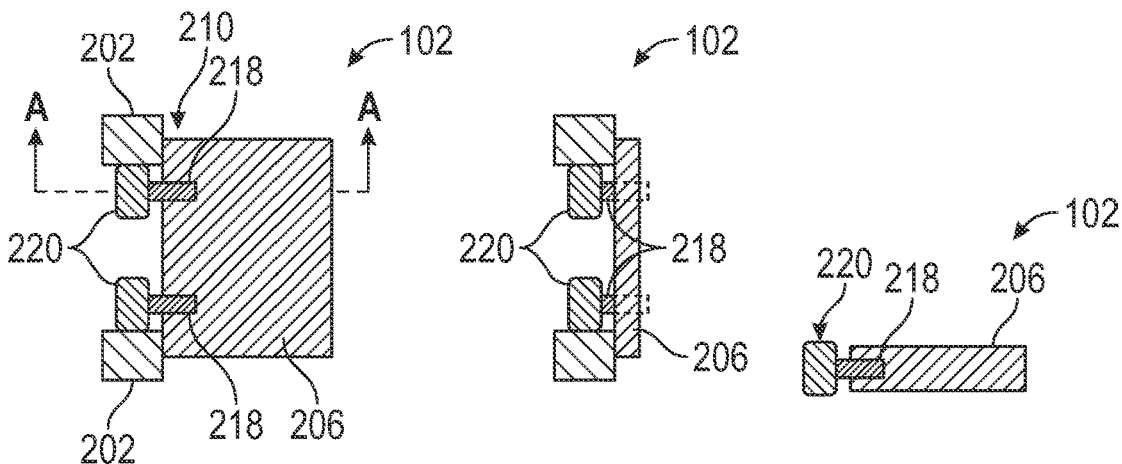

With reference to FIGS. 5A-5C, additional images are depicted of an exemplary tray table 102 as attached to a respective seat back 202, in accordance with exemplary embodiments. In FIGS. 5A and 5B, multiple restraints 218 and associated solenoids 220 are depicted. Further, in FIG. 5C, an exemplary implementation is depicted of one of the restraints 218 and one of the solenoids 220 in an inserted beam type arrangement. As a result, the restraints 218 and solenoids 220 similarly facilitate movement of the tray table 102 (and particularly the second piece 206 thereof) between the open position (depicted in FIG. 5A) during normal operation of the vehicle 100 and the closed position (depicted in FIG. 5B) during a vehicle event.

The restraint 218 and the solenoid 220 have different positions as compared with FIGS. 3A and 3B (e.g., the restraint and the solenoid 220 are disposed beneath the hinge 210 in FIGS. 4A and 4B rather than above the hinge 210 in FIGS. 3A and 3B), but otherwise perform similar roles in FIGS. 4A and 4B. Specifically, as depicted in FIG. 4A, the tray table 102 is in the open position, as the restraint 218 is extended during normal or typical operation of the vehicle 100, so as to provide rigidity and support to help maintain the tray table 102 in the open position (e.g., with the second piece 206 extended away from the seat back 202). Conversely, as depicted in FIG. 4B, the tray table 102 is in the closed position, as the restraint 218 is retracted by the solenoid 220 due to a vehicle event, therefore reducing rigidity and facilitating the tray table 102 to move to the closed position (e.g., with the second piece 206 against the first piece 204 and the seat back 202).

Figure 6:
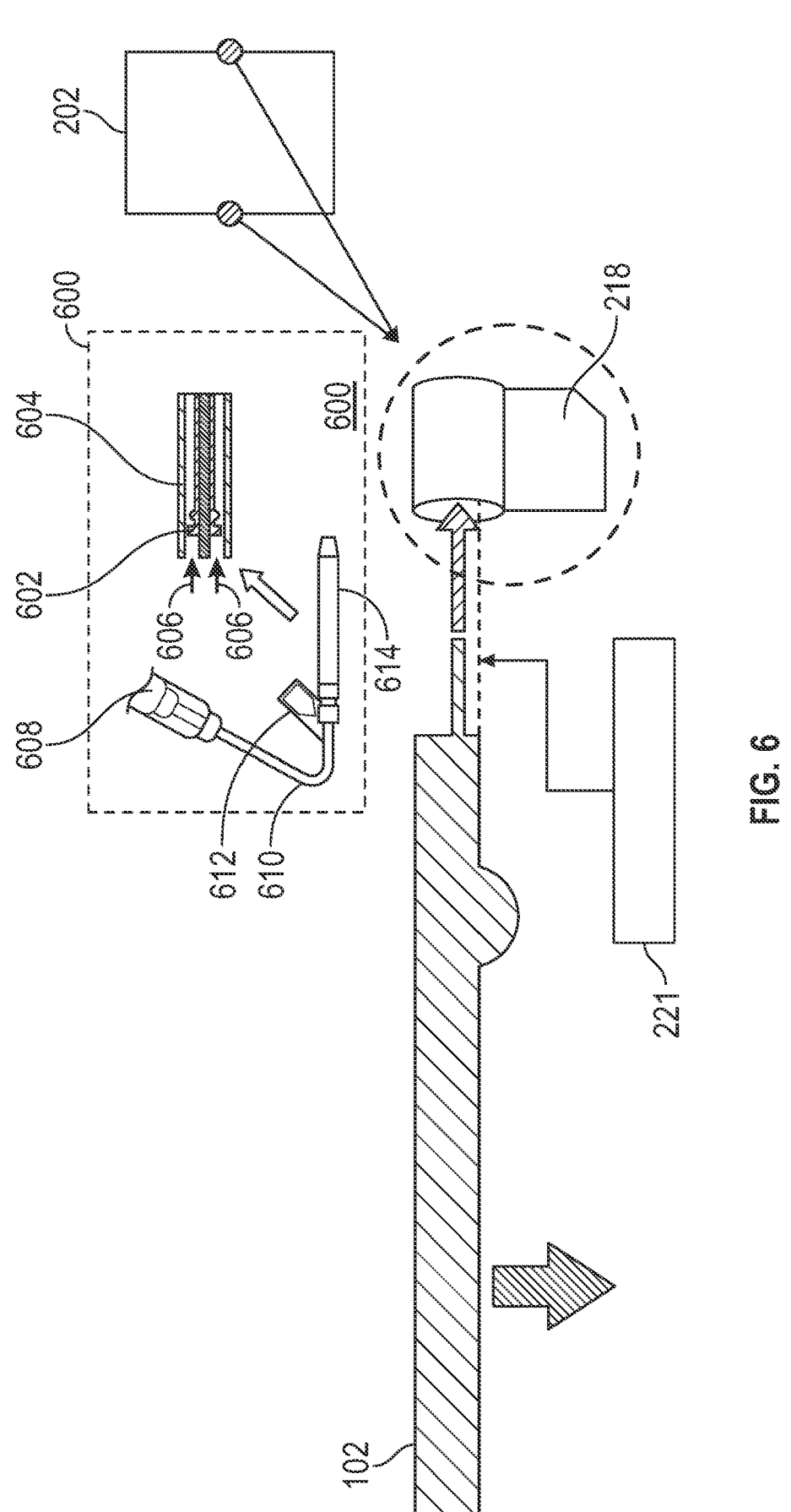

With reference to FIG. 6, an illustration is provided with respect to an exemplary retraction system 600 for reducing rigidity of the tray table 102 and facilitating movement of the tray table 102 (and particularly the second piece 206 thereof) to the closed position during a vehicle event (e.g., in which rapid deceleration, rapid vehicle direction change, and/or other rapid changes in vehicle movement and/or conditions are occurring). As depicted in FIG. 6, in certain embodiments the retraction system 600 is coupled to and/or operates in a similar manner to a seat belt system for the vehicle 100 (e.g., including a front seat belt 608, wire 610, gas generator 612, and seat belt retraction element 614, which are controlled based on gas pressure 606 of the piston 602 and cylinder 604, as depicted in FIG. 6 in accordance with an exemplary embodiment). For example, in various embodiments, when vehicle deceleration exceeds a predetermined value, then a pressure signal is provided, and the retraction system pulls this according to the gas generator, and pushes this component, at which point the retraction system is applied and the restraint (e.g., a pin, beam, and/or other element) moves accordingly, to thereby reduce rigidity of the tray table 102 and facilitate movement to the closed position to minimize impact from the tray table 102 due to the vehicle event.

Accordingly, in accordance with exemplary embodiments, a tray table is provided for rear occupants of a vehicle. In various embodiments, the tray table includes a two-piece shelf, one of which is attached in a fixed manner to a seat back in front of the occupant that is to use the tray table. Also in various embodiments, the tray table is configured to automatically and rapidly folding into the closed position and avoid and/or mitigate contact with occupants of the vehicle during a vehicle event, such as rapid deceleration, rapid change in direction, and/or other rapid movement of the vehicle that could result in contact between the tray table and one or more occupants inside the vehicle.

It will be appreciated that in various embodiments the tray tables may differ from the exemplary embodiments that are depicted in the Drawings and described herein. For example, the vehicle 100 and/or components thereof may differ from the depiction in FIG. 1 and the descriptions herein. It will similarly be appreciated that the tray tables, their components, and their implementations may also vary in different embodiments from those depicted in FIGS. 2A, 2B, 2C, 2D, 3A, 3B, 4A, 4B, 5A, 5B, 5C, and 6 and described herein, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A tray table for a vehicle, the tray table comprising:
a first piece configured to be attached to a seat back of a seat of the vehicle;
a spring hinge;
a second piece movably coupled to the first piece via the spring hinge, the second piece movable between:
an open position, in which the second piece extends away from the first piece; and
a closed position, in which the second piece rests against the first piece; and
one or more restraints that are configured to provide rigidity for the tray table between the first piece and the second piece when the second piece is in the open position, and that are configured to be retracted, by a solenoid, so as to reduce the rigidity and facilitate movement of the second piece to the closed position, and wherein the solenoid is coupled to the one or more restraints.

2. The tray table of claim 1, wherein the second piece is configured to automatically move between the open position and the closed position.

3. The tray table of claim 1, wherein the second piece is configured to move between the open position and the closed position.

4. The tray table of claim 1, further comprising:
one or more respective magnets on both the first piece and the second piece that connect together to hold the first piece and the second piece together while the second piece is in the closed position, and that separate when a force is applied while the second piece is in the closed position.

5. The tray table of claim 1, wherein the solenoid is configured to be coupled to an accelerometer, to receive a signal from the accelerometer, and to at least facilitate retracting the one or more restraints based on the signal.

6. The tray table of claim 1, wherein the one or more restraints are configured to be retracted.

7. The tray table of claim 1, wherein the second piece is at least in part made of silicone.

8. The tray table of claim 7, wherein the second piece includes a reinforcement line.

9. The tray table of claim 1, further comprising a strap configured to hold together the first and second pieces.

10. A tray table seat assembly for a vehicle, the tray table seat assembly comprising:
a seat including a seat back;
a first piece configured to be attached to the seat back;
a spring hinge;
a second piece movably coupled to the first piece via the spring hinge, the second piece movable between:
an open position, in which the second piece extends away from the first piece and the seat back; and
a closed position, in which the second piece rests against the first piece; and
one or more restraints that are configured to provide rigidity for the between the first piece and the second piece when the second piece is in the open position, and that are configured to be retracted, by a solenoid, so as to reduce the rigidity and facilitate movement of the second piece to the closed position, and wherein the solenoid is coupled to the one or more restraints.

11. The tray table seat assembly of claim 10, wherein the second piece is configured to automatically move between the open position and the closed position.

12. The tray table seat assembly of claim 10, further comprising:
one or more respective magnets on both the first piece and the second piece that connect together to hold the first piece and the second piece together while the second piece is in the closed position, and that separate when a force is applied while the second piece is in the closed position.

13. The tray table seat assembly of claim 10, wherein the second piece is at least in part made of silicone and includes a reinforcement line that is in the shape of an "X".

14. A vehicle comprising:
a body;
a drive system configured to propel the body;
a front seat disposed within the body and including a seat back;
a rear seat disposed within the body and behind the front seat;
a tray table seat assembly attached to the front seat, for use by an occupant of the rear seat, the tray table seat assembly comprising:
a first piece attached to the seat back of the front seat;
a spring hinge;
a second piece movably coupled to the first piece via the spring hinge, the second piece movable between:
an open position, in which the second piece extends away from the first piece; and
a closed position, in which the second piece rests against the first piece during a vehicle event; and
one or more restraints that are configured to provide rigidity for the between the first piece and the second piece when the second piece is in the open position, and that are configured to be retracted, by a solenoid, during the vehicle event so as to reduce the rigidity and facilitate movement of the second piece to the closed position, and wherein the solenoid is coupled to the one or more restraints.

15. The vehicle of claim 14, further comprising:

an accelerometer;

wherein the solenoid is coupled to the accelerometer, and is configured to receive a signal from the accelerometer as to the vehicle event, and to at least facilitate retracting the one or more restraints based on the signal during the vehicle event.

* * * * *